(12) United States Patent
Ishiyama et al.

(10) Patent No.: US 7,697,768 B2
(45) Date of Patent: Apr. 13, 2010

(54) METHOD AND APPARATUS FOR ENCODING AN IMAGE

(75) Inventors: Shingo Ishiyama, Kodaira (JP); Haruhiro Koto, Tokorozawa (JP); Wataru Ito, Nishitokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1116 days.

(21) Appl. No.: 11/337,531

(22) Filed: Jan. 24, 2006

(65) Prior Publication Data

US 2006/0168350 A1 Jul. 27, 2006

(30) Foreign Application Priority Data

Jan. 25, 2005 (JP) ............... 2005-016739

(51) Int. Cl.
*G06K 9/36* (2006.01)
*G06K 9/46* (2006.01)
*G06F 15/16* (2006.01)

(52) U.S. Cl. ........................ 382/232; 709/247
(58) Field of Classification Search ................ 382/232, 382/233, 250; 709/247
See application file for complete search history.

(56) References Cited

U.S. PATENT DOCUMENTS

| | | | |
|---|---|---|---|
| 5,237,686 A | 8/1993 | Asano et al. | |
| 5,481,727 A | 1/1996 | Asano et al. | |
| 6,072,830 A * | 6/2000 | Proctor et al. | 375/240.22 |
| 6,124,866 A | 9/2000 | Asano et al. | |
| 2003/0018818 A1 * | 1/2003 | Boliek et al. | 709/247 |
| 2003/0142871 A1 * | 7/2003 | Ishikawa | 382/233 |
| 2005/0013495 A1 * | 1/2005 | Yoshigahara | 382/233 |
| 2005/0041873 A1 * | 2/2005 | Ii | 382/232 |
| 2006/0133684 A1 * | 6/2006 | Srinivasan et al. | 382/250 |

FOREIGN PATENT DOCUMENTS

| | | |
|---|---|---|
| JP | 2226984 | 9/1990 |
| JP | 03205985 | 9/1991 |
| JP | 7336676 | 12/1995 |
| JP | 8-106536 | 4/1996 |

* cited by examiner

*Primary Examiner*—Samir A. Ahmed
*Assistant Examiner*—Li Liu
(74) *Attorney, Agent, or Firm*—Brundidge & Stanger, P.C.

(57) ABSTRACT

An image processing apparatus is provided that efficiently performs compression and encoding when an image obtained from an image pickup device is compressed and encoded for distribution. The image processing apparatus includes an image dividing unit for dividing an image into a plurality of areas, an image compression and encoding unit for compressing and encoding the image for each area generated by dividing the image by the image dividing unit, an image transmission request receiving unit for receiving an image transmission request from a client via a network, a transmission image area selection unit for selecting areas of an image to be transmitted to the client based on the image transmission request from the client; and a selected area image transmission unit for transmitting a compressed and encoded image, corresponding to the areas selected by the transmission image area selection unit, to the client.

5 Claims, 9 Drawing Sheets

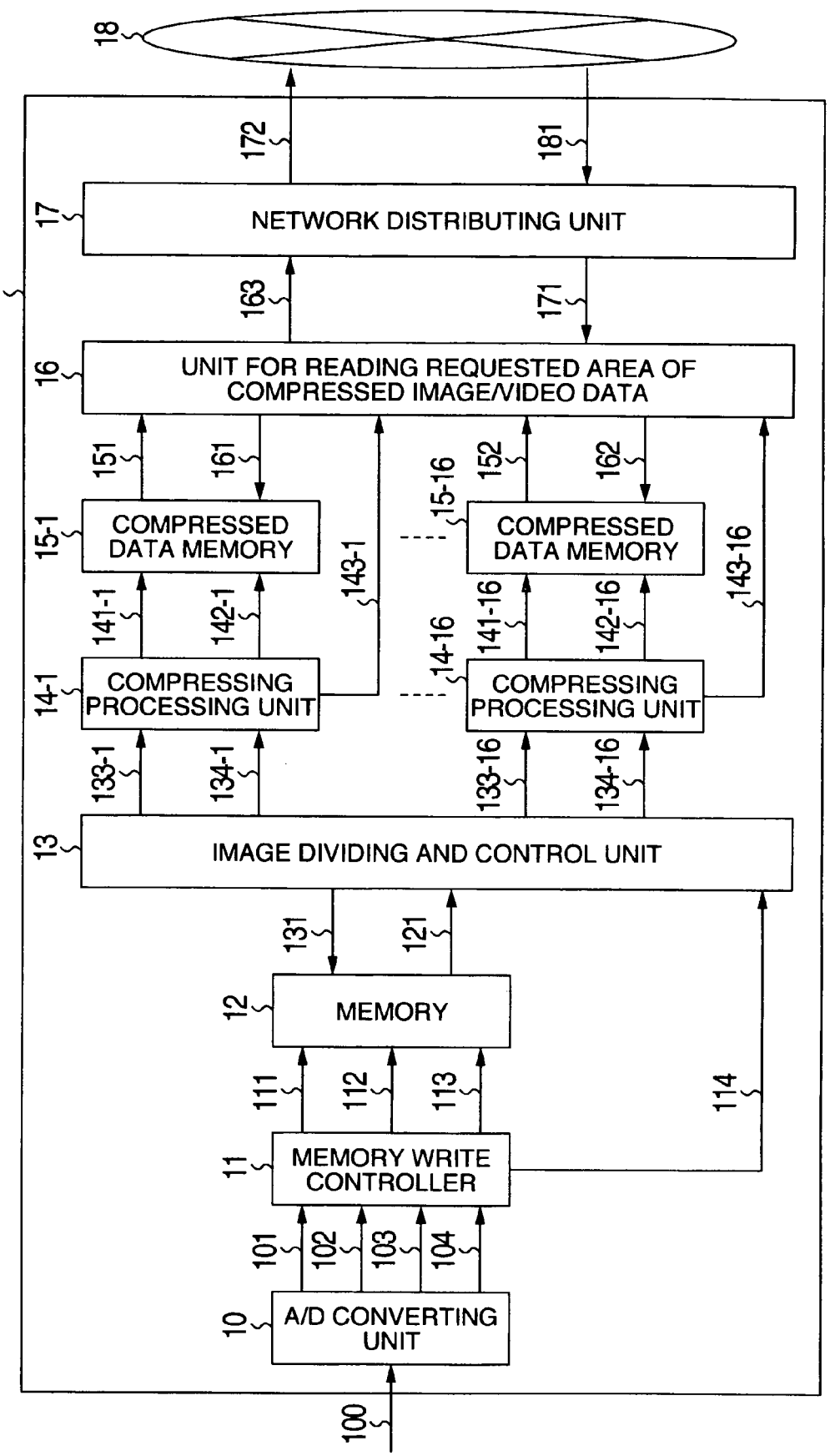

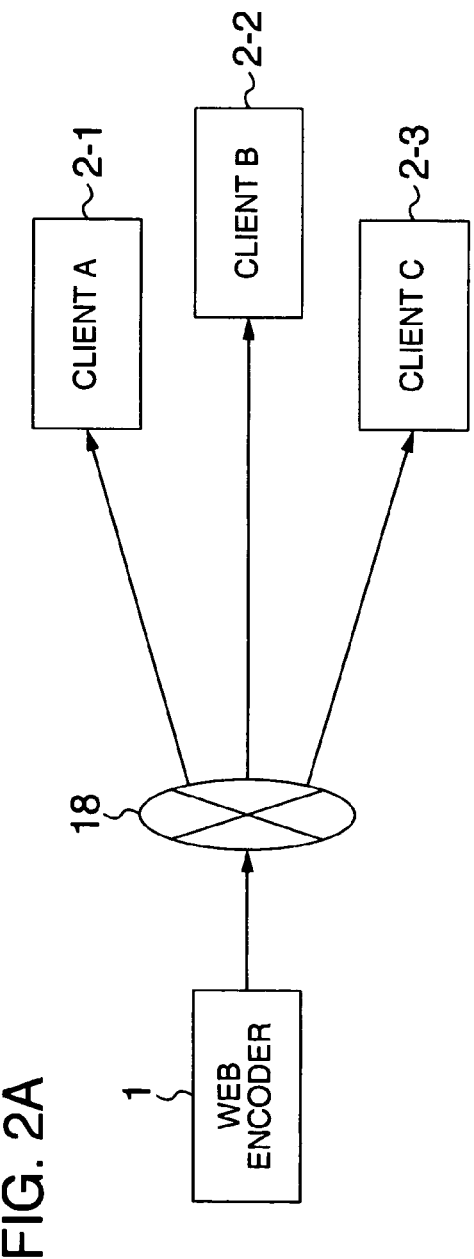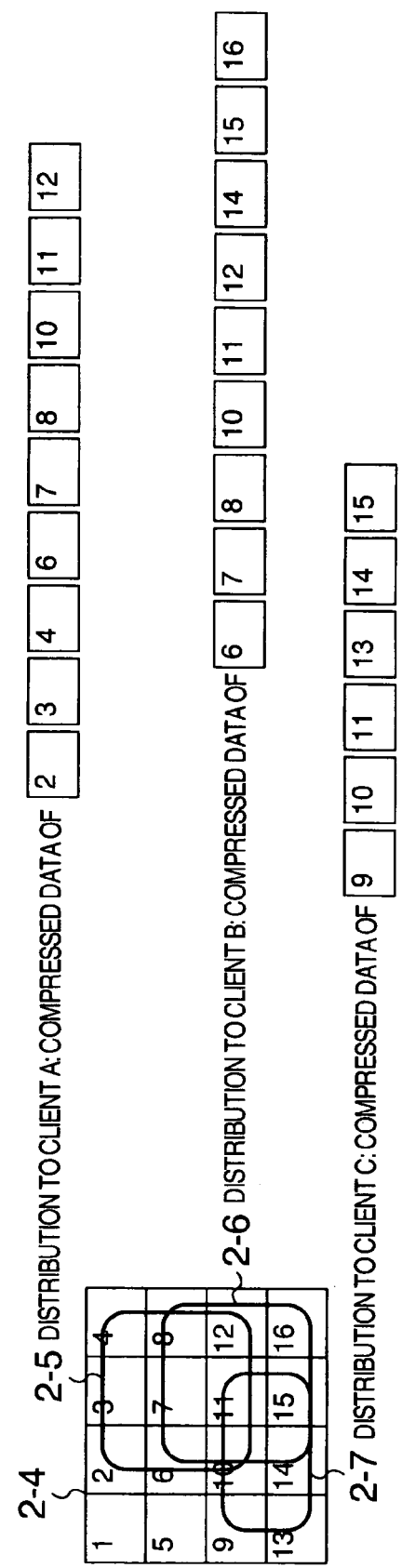

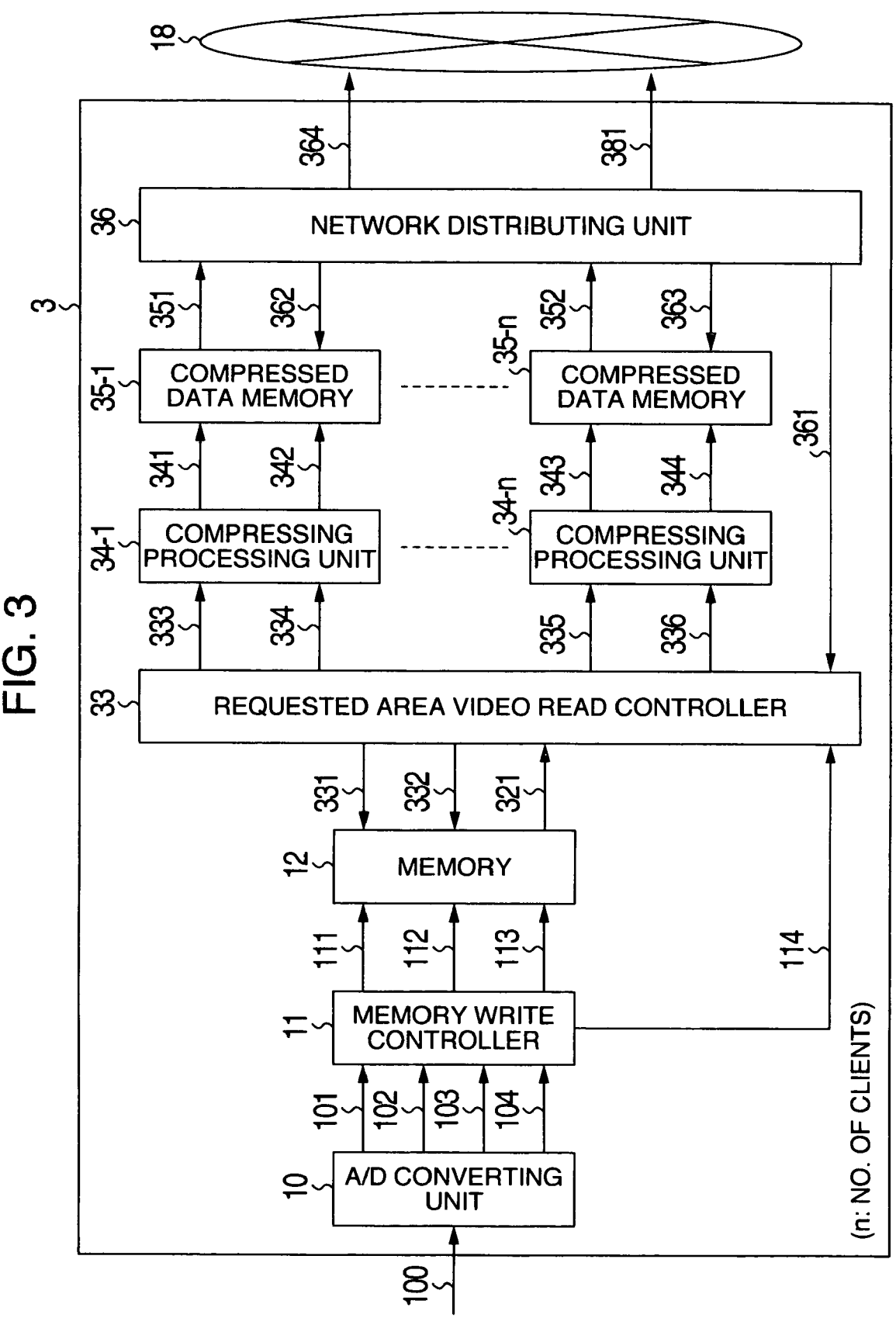

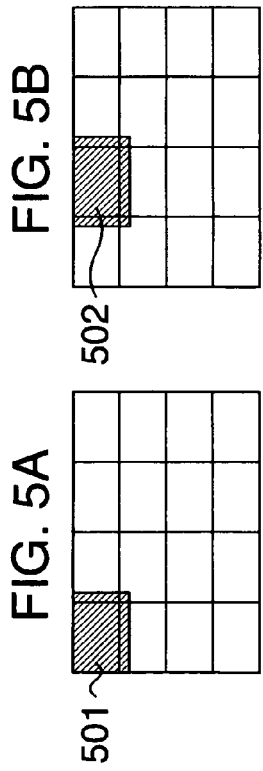
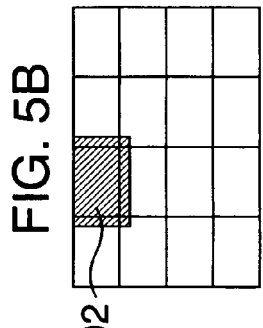
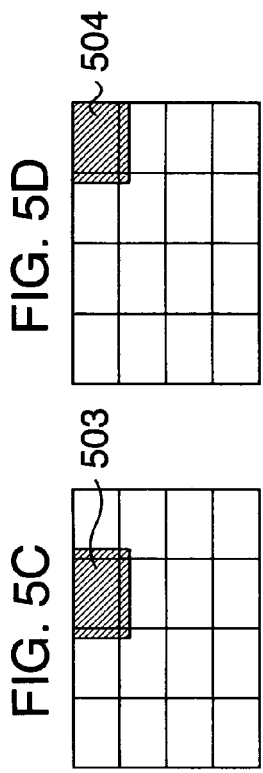
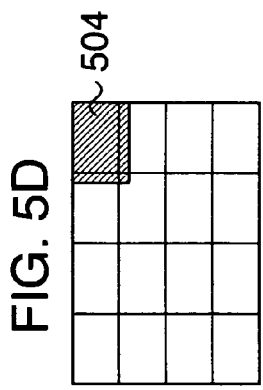
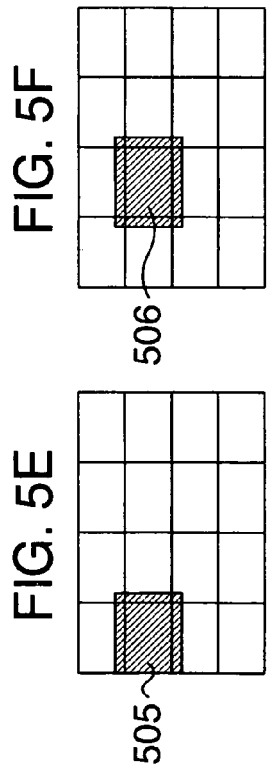
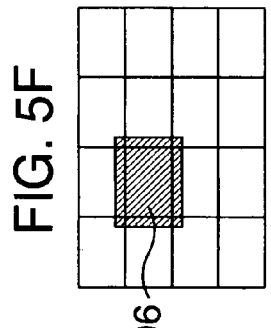
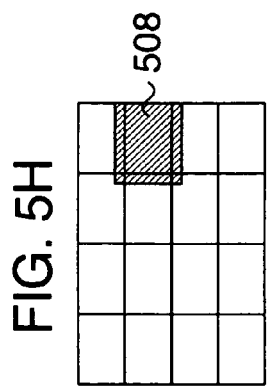
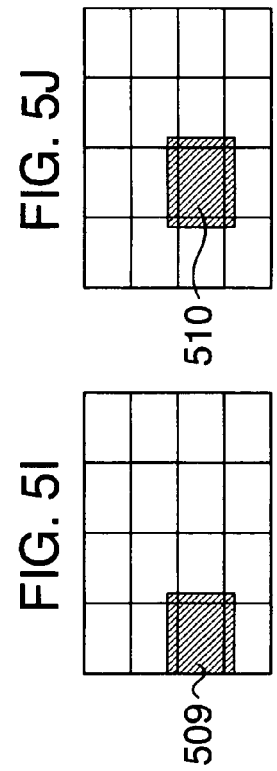
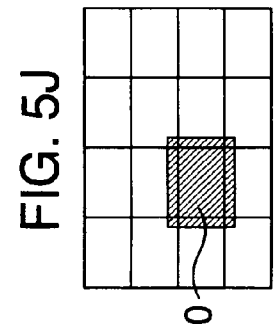
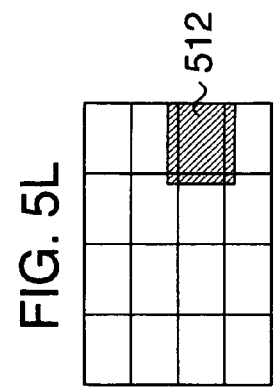
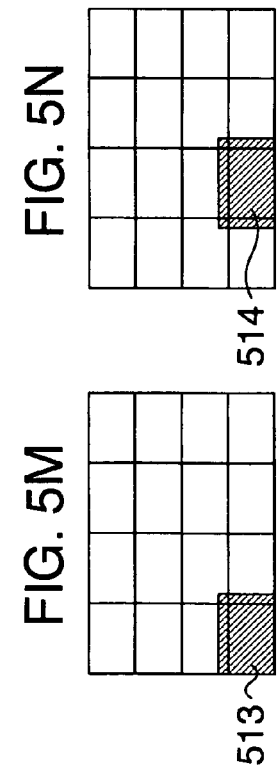
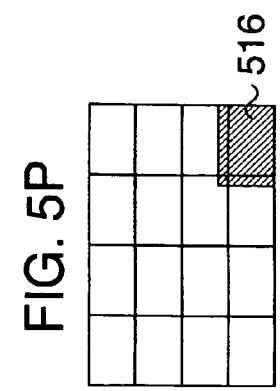

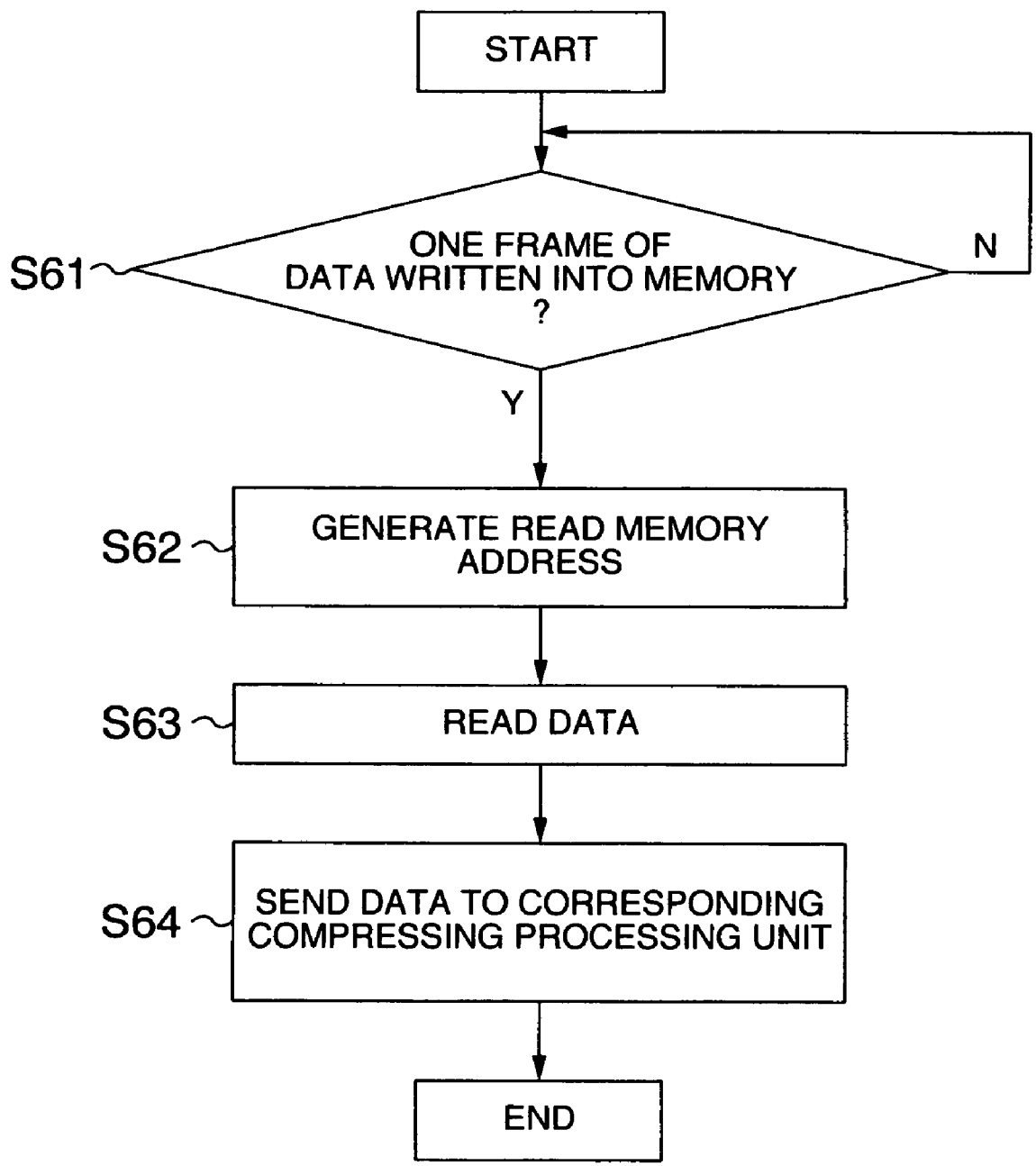

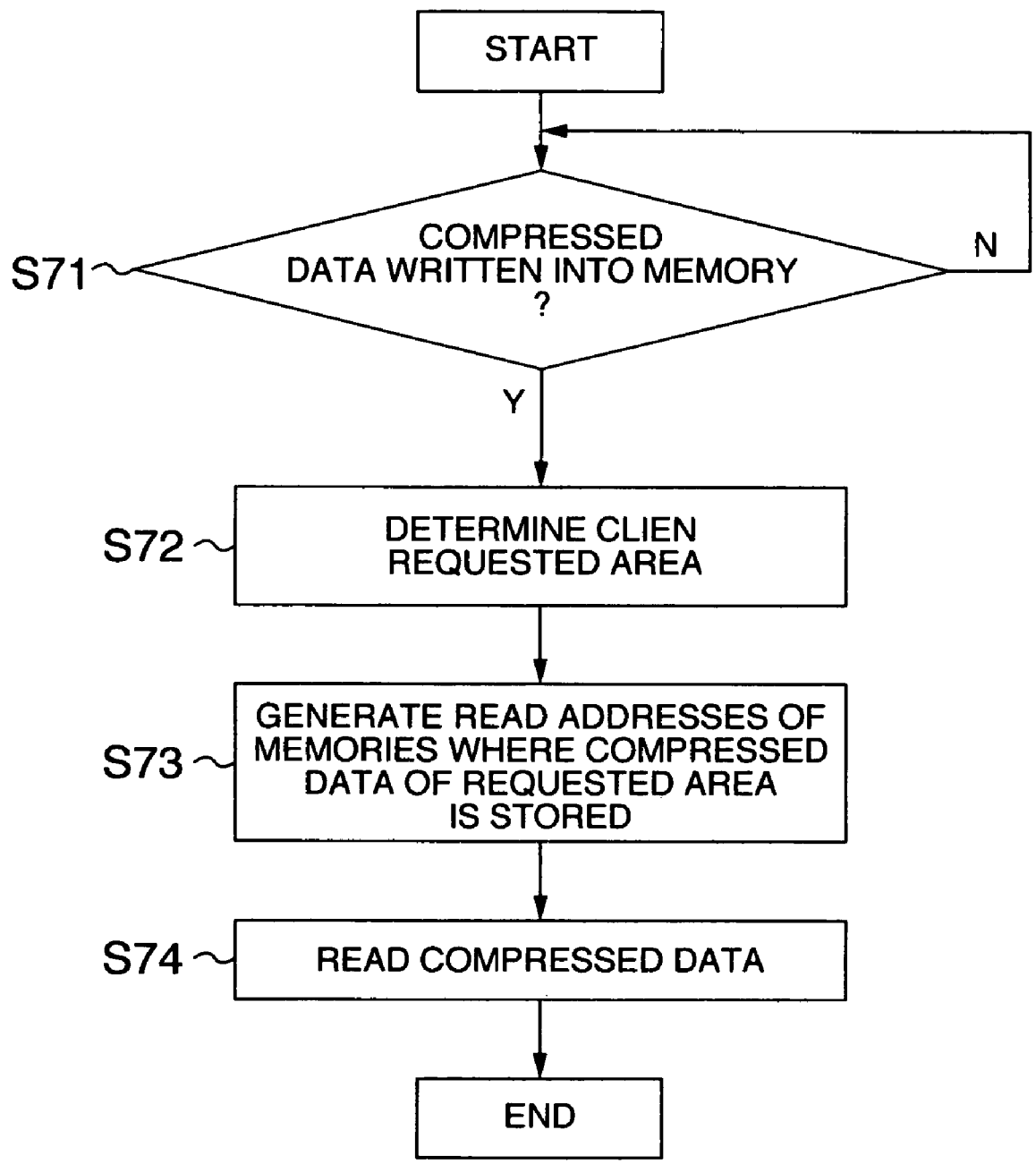

METHOD AND APPARATUS FOR ENCODING AN IMAGE

INCORPORATION BY REFERENCE

The present application claims priority from Japanese application JP2005-016739 filed on Jan. 25, 2005, the content of which is hereby incorporated by reference into this application.

BACKGROUND OF THE INVENTION

The present invention relates to an image processing apparatus that compresses and encodes an image obtained from an image pickup device and distributes the image, and more particularly to an image processing apparatus that efficiently compresses and encodes an image.

Recently, more and more cameras process megapixels of images. For example, in a network-based surveillance system where images/videos shot by a surveillance camera are transmitted from a transmitter to a receiver (client side) via a transmission line (network) for remotely monitoring a specific object, high-definition, high-quality videos are required. Therefore, more and more megapixel cameras will be used in a surveillance system in future. A typical megapixel image is an SXGA (Super eXtended Graphics Array) image. The SXGA, with a resolution of 1280×1024 pixels, has high definition resolution about four times higher than that of the VGA (Video Graphics Array), 640×480 pixels, generally used in a surveillance system. The problems with the SXGA are as follows. (1) The mainstream display for displaying monitored videos on the client side is an XGA (extended Graphics Array) display with a resolution of 1024×768 pixels. (2) Because the client side must control the camera side (for example, control the camera platform) in the surveillance system, the surveillance videos and the control screen (menu bar, etc.,) must always be displayed on the display screen at the same time. In view of the above, it is difficult to display the whole screen of a megapixel image on the display without losing the high definition of the image.

Therefore, the function to cut out a part of a megapixel image without losing the high definition of the image and display it in an enlarged format, the so-called electronic Pan Tilt Zoom (PTZ) function, is important in the surveillance system.

Conventionally, an image transmission apparatus is disclosed that cuts out and compresses the data of only a required part of an image for efficient transmission and recording (for example, see JP-A-8-106536).

SUMMARY OF THE INVENTION

However, in a conventional system where a part of an image is cut out and transmitted to multiple remote clients, no system is designed to reduce the processing load of the transmitting side.

In view of the foregoing, it is an object of the present invention to provide an image processing apparatus that efficiently compresses and encodes an image that is obtained from an image pickup device and is compressed and encoded before being distributed.

To achieve the above object, an image processing apparatus according to the present invention comprises an image dividing unit for dividing an image into a plurality of areas; an image compression and encoding unit for compressing and encoding the image for each area generated by dividing the image by the image dividing unit; an image transmission request receiving unit for receiving an image transmission request from a client via a network; a transmission image area selection unit for selecting areas of an image to be transmitted to the client based on the image transmission request from the client; and a selected area image transmission unit for transmitting a compressed and encoded image corresponding to the areas selected by the transmission image area selection unit to the client.

Various types of images, such as a moving image, a still image, and a semi-moving image, may be used. An image may be divided into a plurality of areas in various ways.

To achieve the above object, the image dividing unit of the image processing apparatus according to the present invention divides the image in such a way that each area overlaps with other areas.

To achieve the above object, the selected area image transmission unit of the image processing apparatus according to the present invention transmits a compressed and encoded image, which corresponds to areas requested by image transmission requests from more clients, with priority given thereto.

To achieve the above object, the selected area image transmission unit of the image processing apparatus according to the present invention transmits a compressed and encoded image to be transmitted to a higher-priority client before a compressed and encoded image to be transmitted to a lower-priority client.

To achieve the above object, the image compression and encoding unit of the image processing apparatus according to the present invention comprises a plurality of processors for compressing and encoding images of the areas and processing loads of the processors are averaged by preventing the same processor from compressing and encoding the same area continuously.

As described above, the image processing apparatus according to the present invention compresses and encodes each area generated by dividing an image by the image dividing unit. Therefore, when one image obtained by an image pickup device is compressed and encoded for distribution, the image processing apparatus according to the present invention efficiently performs compression and encoding processing.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing an example of the configuration an image processing apparatus in a first embodiment of the present invention.

FIGS. 2A and 2B are diagrams showing the relation between the active video/image and the videos requested by the clients in the first embodiment of the present invention.

FIG. 3 is a diagram showing an example of the configuration of an image processing apparatus in a second embodiment of the present invention.

FIGS. 5A-5P are diagrams showing the divisions of an image in one embodiment of the present invention.

FIG. 6C is a flowchart showing the operation of one embodiment the image dividing and control unit in the first embodiment of the present invention.

FIG. 7C is a flowchart showing the operation of the unit for reading requested area of compressed image/video data in the first embodiment of the present invention.

DETAILED DESCRIPTION OF THE EMBODIMENTS

Figure 4A:
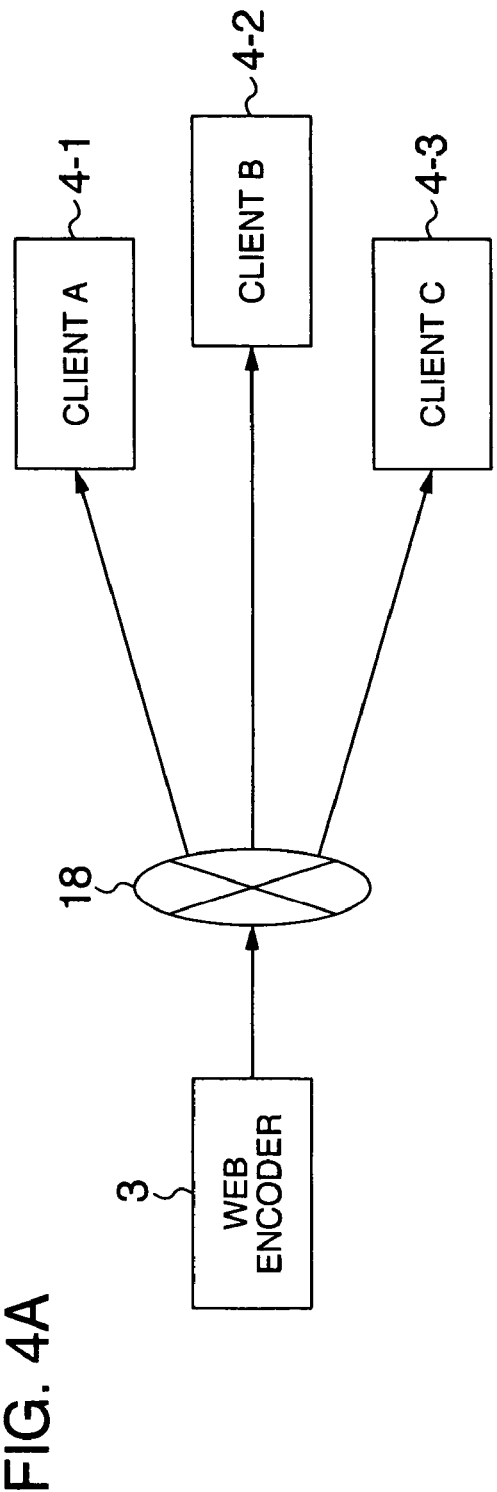
FIGS. 4A and 4B are diagrams showing the relation between the active video/image and the videos requested by the clients in the second embodiment of the present invention.

Embodiments of the present invention will be described below with reference to the drawings.

FIG. 1 is a diagram showing an example of the configuration of a Web encoder (image processing apparatus) 1 in one embodiment of the present invention.

The Web encoder 1 in this embodiment comprises an A/D converting unit 10, a memory write controller 11, a memory 12, an image dividing and control unit 13, a compressing processing unit 14-1, a compressing processing unit 14-16 (the numeral 14 is used to collectively refer to the compressing processing units), a compressed data memory 15-1, a compressed data memory 15-16 (the numeral 15 is used to collectively refer to the compressed data memories), a unit for reading requested area of compressed image/video data 16, and a network distributing unit 17. The Web encoder 1 is connected to a network 18.

Next, the following shows an example of processing executed by the Web encoder 1 in this embodiment shown in FIG. 1.

The A/D converting unit 10 outputs the following signals to the memory write controller 11: a digital video signal 101, an Hsync signal (Horizontal synchronizing signal) 102, and a Vsync signal (Vertical synchronizing signal) 103, all of which are generated by A/D converting an analog video signal 100 received from an imaging device such as a camera not shown, and a clock signal 104 synchronized with the digital video signal 101.

The memory write controller 11 receives the digital video signal 101, the Hsync signal 102, the Vsync signal 103, and the clock signal 104 and extracts an active video/image signal 111 from the digital video signal 101.

For the NTSC signal, there are 525 lines of video signal in each frame. The active video/image signal refers to 480 lines of video signal corresponding to one frame of 525 lines minus the blanking area lines.

The memory write controller 11 generates a signal indicating the position of the active video/image signal 111, and outputs the active video/image signal 111, a write signal 112 of the active video/image signal 111, and a clock signal 113 to the memory 12.

The memory write controller 11 also outputs a write end signal 114, which indicates to the memory 12 that one frame of active video/image signal 111 has been written, to the image dividing and control unit 13.

In response to the write end signal 114, the image dividing and control unit 13 generates a request signal 131, used for reading one frame of active image stored in the memory 12, and outputs the generated signal to the memory 12. The image dividing and control unit 13 reads one frame of active video/image data 121 from the memory 12 and equally divides the active video/image data 121, which has been read, to generate multiple pieces of area video data.

The image dividing and control unit 13 outputs the multiple pieces of divided area video data and video information to the respective compressing processing units 14.

The video information refers to the information required for compressing an area video, such as the image size of an area video to be output to the compressing processing unit 14.

In this embodiment, the image dividing and control unit 13 divides the active video/image equally into 16 and outputs the area video data of each division to the corresponding compressing processing unit 14. In this case, assume that there are 16 compressing processing units 14, one for each division (compressing processing units 14-1 to 14-16).

To make the description simple, the following describes only the first area video data and the 16th area video data and omits the description of other area video data.

That is, the image dividing and control unit 13 outputs first area video data 133-1 and video information 134-1 to the compressing processing unit 14-1, and 16th area video data 133-16 and video information 134-16 to the compressing processing unit 14-16.

Figure 6A:
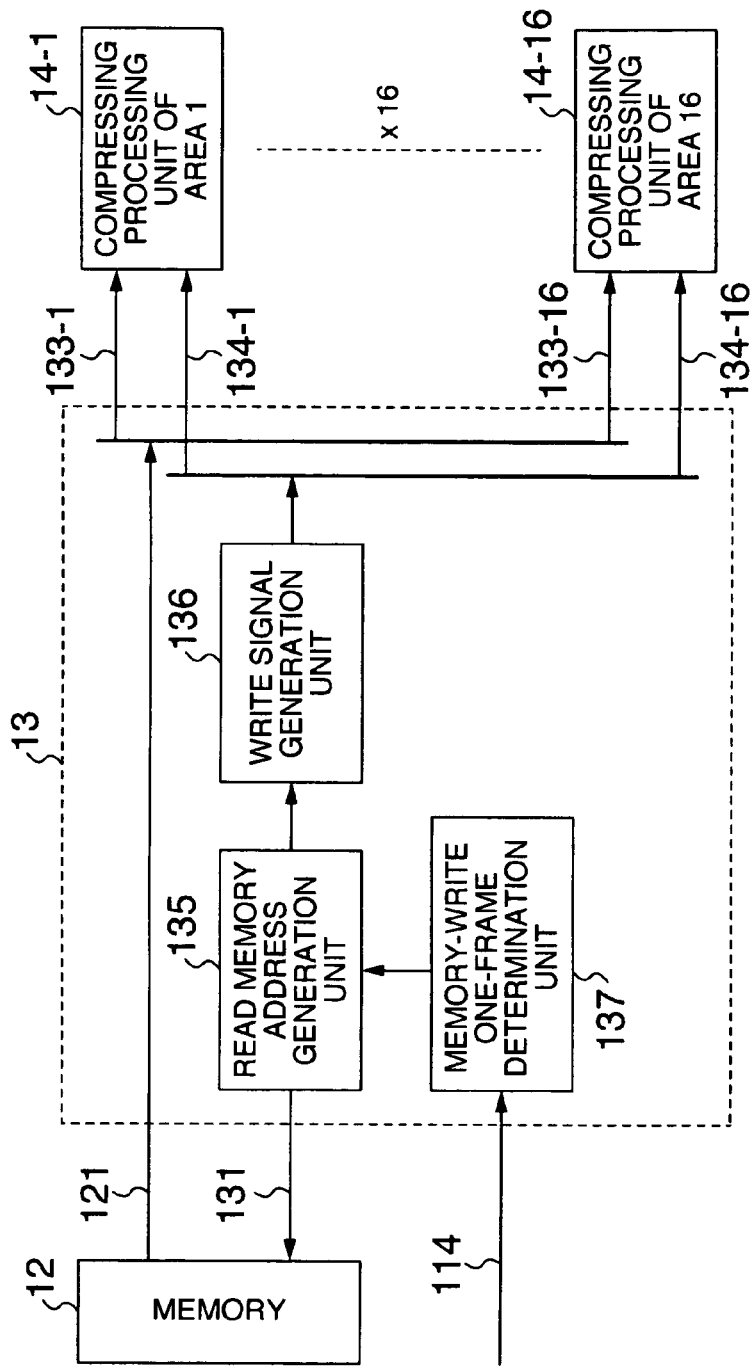
FIGS. 6A and 6B are block diagrams showing one embodiment of an image dividing and control unit in the first embodiment of the present invention.
Figure 6B:
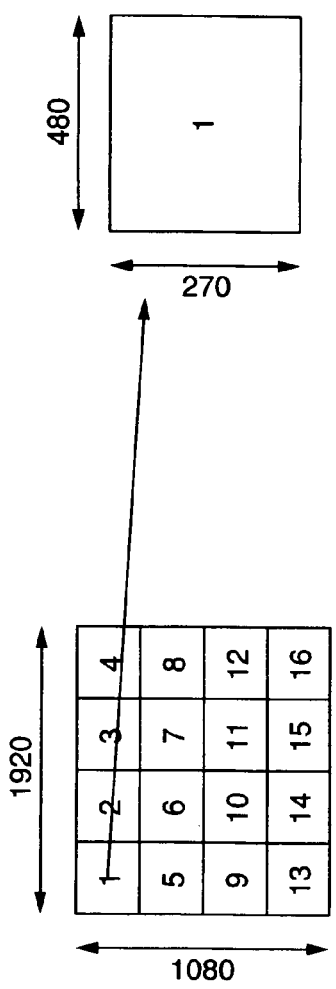

The following describes one embodiment of the configuration of the image dividing and control unit 13 with reference to FIGS. 6A, 6B, and 6C.

In response to the signal 114 indicating that one frame (for example, 1920×1080 pixels) of video signal (active video/image data) is written into the memory (S61), a memory-write one-frame determination unit 137 outputs a signal to a read memory address generation unit 135 to request it to read the video signal.

The read memory address generation unit 135 generates an address in the memory 12 in which one division of data (480×270), generated by dividing 1920×1080 into 16 as shown in FIG. 1 or FIG. 6B, is stored and outputs the generated address to the memory 12 (S62). The predetermined one division of video signal (area video data) corresponding to the generated address is read from the memory 12 (S63).

A write signal generation unit 136 outputs one division of video signal, which has been read, to corresponding one of compressing processing units 14-1 to 14-6 (S64).

The compressing processing unit 14-1 receives the area video data 133-1 and the video information 134-1 from the image dividing and control unit 13, compresses and encodes the received area video data 133-1, and outputs compressed data 141-1 and a write signal 142-1 to the compressed data memory 15-1.

The compressing processing unit 14-1 outputs a write end signal 143-1 to the unit for reading requested area of compressed image/video data 16 to indicate that one area of compressed data has been written into the compressed data memory 15-1.

Similarly, the compressing processing unit 14-16 receives the area video data 133-16 and the video information 134-16 from the image dividing and control unit 13, compresses and encodes the received area video data 133-16, and outputs compressed data 141-16 and a write signal 142-16 to the compressed data memory 15-16.

The compressing processing unit 14-16 outputs a write end signal 143-16 to the unit for reading requested area of compressed image/video data 16 to indicate that one area of compressed data has been written into the compressed data memory 15-16.

The compressed data memory 15 stores compressed area video data received from the compressing processing unit 14. In this example, the compressed data memory 15 is divided into 16 that is the number of divisions.

The network distributing unit 17 receives requested-video information 181 from a client via the network 18 and outputs requested-video information 171 to the unit for reading requested area of compressed image/video data 16. The requested-video information refers to the information on one or more video areas in one screen of a video that the client requests to receive. For example, the client sends new requested-video information to the Web encoder 1 via the network whenever a change is made in the areas of a video that the client requests to receive.

Based on the requested-video information 171 issued by the client and received from the network distributing unit 17, the unit for reading requested area of compressed image/video data 16 selectively reads the area compressed data of the video, divided into 16 as described above, from the compressed data memories 15-1 to 15-6 to form a client-requested video and outputs area compressed data 163 to the network distributing unit 17.

For example, the unit for reading requested area of compressed image/video data 16 outputs a read signal 161 and a read signal 162 to the compressed data memory 15-1 and the compressed data memory 15-16, respectively, reads compressed data 151 and compressed data 152 from the compressed data memory 15-1 and the compressed data memory 15-16, and outputs the area compressed data 163 to the network distributing unit 17.

Figure 7A:
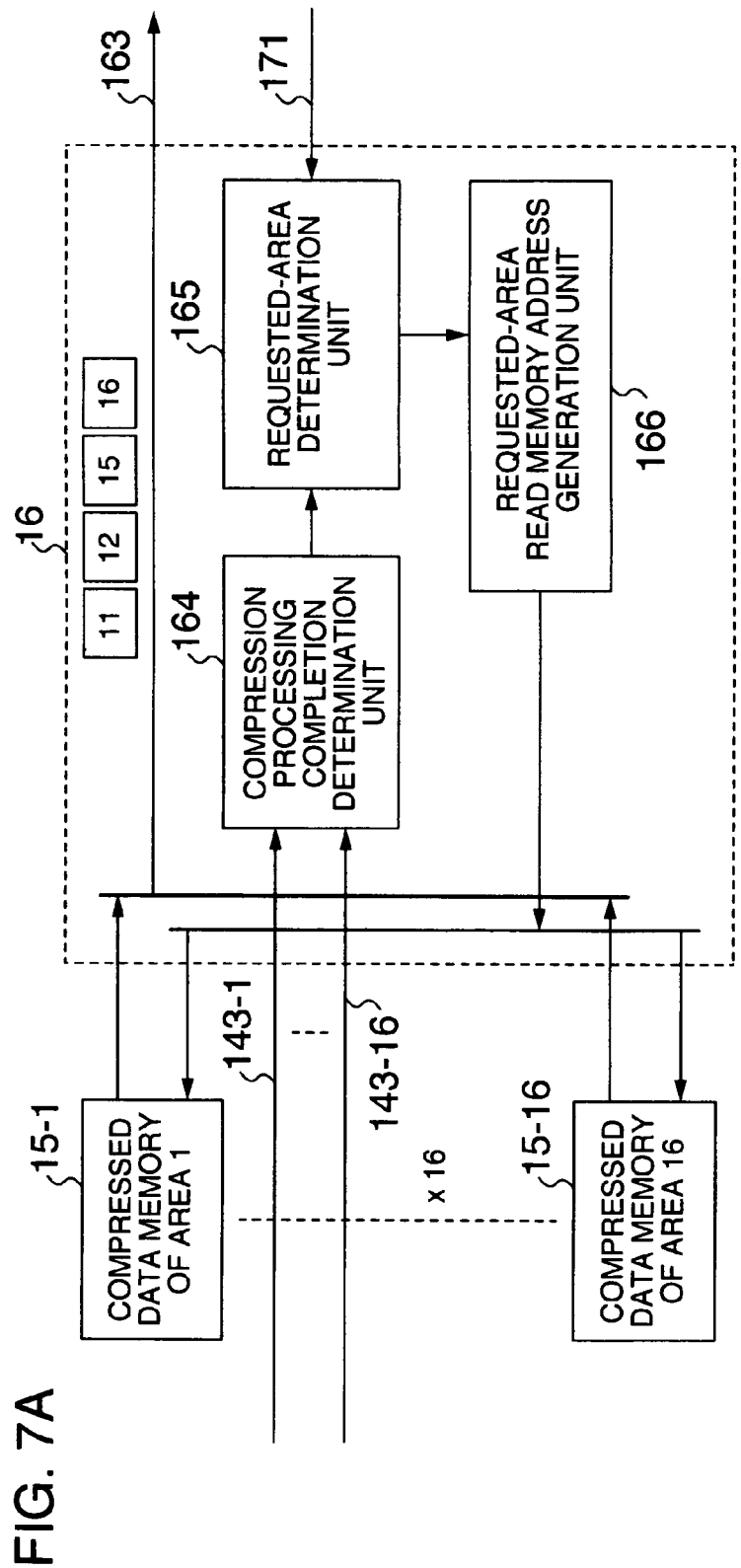
FIGS. 7A and 7B are block diagrams showing a unit for reading requested area of compressed image/video data in the first embodiment of the present invention.
Figure 7B:
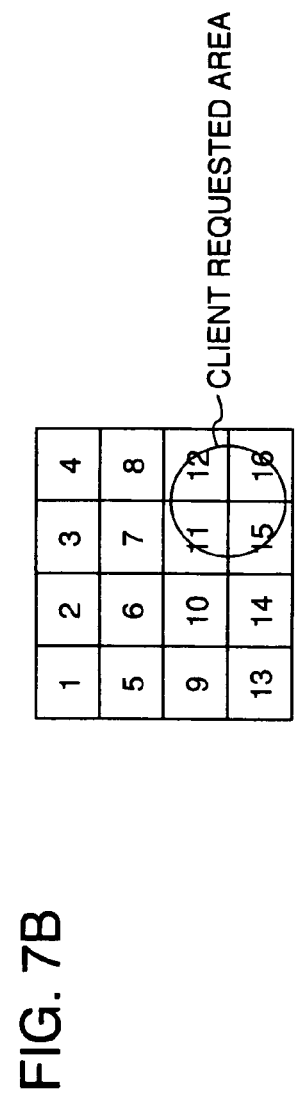

The following describes one embodiment of the configuration of the unit for reading requested area of compressed image/video data 16 with reference to FIGS. 7A, 7B, and 7C.

When a compression processing completion determination unit 164 receives a signal 143, which indicates that compressed data has been written into the memory, and determines that the compression processing has been completed (S71), it sends a signal to a requested-area determination unit 165 to indicate that the compression processing is completed.

In response to an image request signal from a client via the network distributing unit 17, the requested-area determination unit 165 determines one or more areas corresponding to the request signal (S72). If the requested-area determination unit 165 has already received a signal indicating that the compression processing of the memories corresponding to the areas is completed, it sends an instruction signal, which instructs to generate the addresses of the corresponding memories, to a requested-area read memory address generation unit 166.

In response to the instruction signal, the requested-area read memory address generation unit 166 generates the addresses of the memories (S73). Using the generated addresses, the compressed data corresponding to the areas requested by the client are read from the memories in which the compressed data is stored (S74).

For example, when the client requests to view the video of areas 11, 12, 15, and 16 (see FIG. 7B), the unit for reading requested area of compressed image/video data 16 reads the compressed data corresponding to areas 11, 12, 15, and 16 from the memories, 15-1 to 15-16, in which the compressed data is stored, and sends the data to the network distributing unit 17.

The network distributing unit 17 adds the network protocol to the area compressed data 163, received from the unit for reading requested area of compressed image/video data 16, to generate network distribution data 172 and distribute it to the network 18.

As described above, the Web encoder 1 in this embodiment simply divides a video equally into 16 for compression and encoding, stores the compressed data of a area video in the compressed data memory 15, selects the compressed data of the area video which is divided into 16 and from which a requested video is formed, and distributes the selected compressed data to the client. Therefore, even if the area videos requested by multiple clients overlap, the overlapped area videos are compressed only once. This method reduces the load of the compressing and encoding processing of the Web encoder 1.

Any compression and encoding method, MPEG-4, JPEG, lossless coding, or lossy coding, may be used in this embodiment.

Although the Web encoder 1 distributes area compressed data to a client in this embodiment, another configuration may also be used. For example, area compressed data may be distributed to a client via an image accumulation/distribution server.

The image accumulation/distribution server is a device that accumulates image data, received via a network, in a disk device (random-access recording device for accumulating data) in the server and that, in response to a request from a client, distributes desired image data to the client who sends the request via the network.

The number of divisions, 16, of a video is exemplary only. The number of divisions may be set according to the setup status of the actual system.

Next, the following describes the relation between an active video/image and a client requested video with reference to FIGS. 2A and 2B.

As shown in FIG. 2A, the video distribution system of the present invention comprises the Web encoder 1, client A 2-1, client B 2-2, and client C 2-3. The Web encoder and clients A, B, and C are connected via the network 18. In the description below, the area of a video in an active video/image 2-4 requested by client A is 2-5, the area of a video requested by client B is 2-6, and the area of a video requested by client C is 2-7.

In the video distribution system shown in FIG. 2A, the Web encoder 1 divides the active video/image of one frame equally into 16 and compresses each of the area videos generated by the division. After that, the Web encoder 1 selects one or more videos, required to constitute a video requested by each client, from the compressed data of 16 area videos and sends the selected compressed data to the client.

More specifically, the areas constituting the video 2-5 requested by client A 2-1 are areas 2, 3, 4, 6, 7, 8, 10, 11, and 12, as shown in FIG. 2B. The areas constituting the video 2-6 requested by client B 2-2 are areas 6, 7, 8, 10, 11, 12, 14, 15, and 16. The areas constituting the video 2-7 requested by client C 2-3 are areas 9, 10, 11, 13, 14, and 15.

Although there are overlapping areas depending upon the requests from clients A, B, and C as described above, the area videos of the overlapping areas need be compressed and encoded only once. Once the area videos are compressed and encoded, the Web encoder 1 is only required to select the compressed data of videos from those generated by dividing the active video/image into 16 and send the selected compressed data to the clients. Even if multiple same requests for one area video are issued, the Web encoder 1 does not have to compress and encode the area video multiple times.

Therefore, the Web encoder 1 in this embodiment divides one frame of active video/image equally into multiple areas, compresses the area videos with the compressing processing unit 14, writes the compressed data of the areas into the respective memories, selects the area compressed data required to constitute a video requested by a client, reads the selected area compressed data from the memories, and sends the area compressed data, which has been read, to the client. The client decompresses the received area compressed data and combines the videos of decompressed areas to reproduce the video requested by the client.

Even if one or more videos requested by multiple clients overlap, the Web encoder 1 in this embodiment compresses those videos only once. Thus, the Web encoder 1 in this embodiment can perform the compression processing more efficiently.

The compressed data of areas may be sent to a client, beginning with the compressed data of any area. For example, with priority assigned to the clients, the area compressed data to be sent to a higher-priority client may be sent first followed by the area compressed data to be sent to a lower-priority client. The priority may be assigned in various ways depending upon the contents requested by the system.

For example, if high priority is assigned to a client in an environment where real-time processing is important, the delay time from the moment the Web encoder 1 captures a video to the moment the client displays the video is reduced. Alternatively, if high priority is assigned to a client which selects fewer number of areas, the time from the moment data is sent to the first client to the moment the transmission of data to the second client is started is reduced.

In still another example of configuration, the areas selected by the largest number of clients are sent by priority based on the statistics on the number of selections for each area. This configuration allows the clients to receive area compressed data sooner on the whole, thereby improving the performance of the whole system.

For example, when video requests are received from client A 2-1, client B 2-2, and client C 2-3 shown in FIG. 2A, areas 10 and 11 are selected by the largest number of clients (three clients in this case) as shown in FIG. 2B. Therefore, the highest priority is assigned to areas 10 and 11. The next highest priority is assigned to areas 6, 7, 8, 12, 14, and 15 that are selected by two clients, and the next highest priority to areas 2, 3, 4, 9, 13, and 16 that are selected by one client.

Next, the following describes the load of the compression and encoding processing of the Web encoder 1 in this embodiment using practical examples. For example, assume that the image size of an input image is 1280×960, the number of connected clients is n, and compression processing capability of the VGA (image size: 640×480) is 1.

The image size of the input image is four times larger than the VGA image size. The input image is divided equally into 16. The image size of one division is 320×240. Therefore, the compression processing capability required for the compressing processing unit 14 to compress one division area is ¼. Because there are 16 compressing processing units 14, the compression processing capability of the Web encoder 1 is ¼ times 16, that is, 4. Even if the number of connected clients is increased to 50, the compression processing capability of the Web encoder 1 still remains 4 and does not depend on the number of clients.

Although the active video/image is divided equally into 16 in this embodiment, the present invention achieves the effect of compressing each area only once even when the areas required by multiple clients overlap. Therefore, not only equal division but also unequal division or area-overlapping division may also be used in another example of configuration.

For example, in another example in which the active video/image is divided unequally, the image size, 1280×960, of the input image can also be divided into 320, 480, 320, and 160 pixels from right to left (in equal division, 320, 320, 320, and 320 from right to left), and 240, 360, 120, and 240 pixels from top to bottom (in equal division, 240, 240, 240, and 240 from top to bottom).

In addition, in still another embodiment, it is also possible to divide the active video/image into areas for the components, such as a road or a building displayed as the active video/image, and then compress those areas. In this case, a division area represents a component of the input image to allow the user on the client to perform predetermined image processing (sharpening processing, smoothing processing, contrast enhancement, etc.) for the components. With this ability, a partial video of a particular component in the active video/image can be highlighted.

In the example of equal division described above in which the active video/image is divided equally into areas each composed of 320×240 pixels. Instead, when area-overlapping division is allowed, the active video/image can also be divided, for example, into the areas 501-516 each extended by eight pixels vertically and horizontally as shown in FIGS. 5A-5P. In this case, when a client receives the required areas and decompresses them, the overlapping parts are generated between the areas. Those overlapping parts are averaged before the area images are joined.

Because, in the example of equal division described above, the active video/image is divided into non-overlapping areas and the areas are compressed independently, there is a possibility that a joint line appears between the jointed areas in the video displayed on the client side. In contrast, if area overlapping is allowed as described above when the active video/image is divided into areas, no joint line appears in the display video and therefore a more natural video can be displayed on the client side.

In this embodiment, the Web encoder 1 divides the active video/image equally into 16, selects at least one piece of area compressed data based on request video information received from a client, and distributes the area compressed data of a part of the whole screen to the client.

In another embodiment, it is also possible for the Web encoder 1 to regularly distribute the whole active video/image to a client to allow the operator of the client to reference it for setting the areas of a video that the client requests to receive.

In this case, the client requires only general information on the whole active video/image for setting the areas of a video that the client requests to receive. Therefore, to save the transmission bandwidth of the network 18, the Web encoder 1 distributes to the client either compressed data, which is a compressed and encoded reduced-image generated by downsampling the whole active video/image, or compressed data generated by compressing and encoding the whole active video/image at a compression rate higher than that at which division area video data is compressed and encoded.

The following describes the compressing processing unit 14-1 to the compressing processing unit 14-16 of the Web encoder 1 in this embodiment each of which is configured by an independent processor such as a DSP (Digital Signal Processor).

In this case, the processing load of the compressing processing units 14 depends on the complexity of video data in the areas. For example, assume that the compressing processing unit 14-1 compresses and encodes the video data in area 1 and that the compressing processing unit 14-2 compresses and encodes the video data in area 2.

Also assume that the video data in area 1 is a complex image including white noises and that the video data in area 2 is a relatively simple video. In this case, the processing load (processing time) of the compressing processing unit 14-1 that compresses and encodes the video data in area 1 is heavy but the processing load of the compressing processing unit 14-2 that compresses and encodes the video data in area 2 is light. That is, the processing time of area 1 whose load is heavy is long, while the processing time of area 2 is short.

Therefore, each compressing processing unit 14 does not compress and encode the video data of the same area continuously. For example, if the compression and encoding of the video data in area 2 is completed before the compression and encoding of the video data in area 1 is finished, the compressing processing unit 14-2 compresses and encodes the video data in area 1 of the next frame. That is, if the video data of an area of the current frame is not yet compressed or encoded, the video data of the area of the next frame is compressed and encoded by some other compressing processing unit 14 that has completed the compression and encoding processing.

That is, if each compressing processing unit 14 compresses and encodes the video data of the same area continuously and the compressed and encoded area video data is distributed to a client one after another, complex video data appears continuously only in some areas with the result that the processing load becomes heavy and the distribution of the compressed data of those areas is delayed. In this case, when the whole video is reproduced on the client side, the frame rate decreases only in those areas during reproduction.

To solve this problem, the processing load of the compressing processing units 14 is averaged by preventing a specific compressing processing unit 14 from performing heavy-load compression and encoding continuously as described above to prevent the frame rate from being decreased on the client side when the video is reproduced.

The compressing processing unit 14 may be configured by multiple processors in various ways. For example, the processors may be provided, one for each division of a video, for example, the compressing processing unit 14-1 for area 1, compressing processing unit 14-2 for area 2, and so on. Alternatively, the number of processors may be different from the number of divisions of a video, for example, the compressing processing unit 14-1 for areas 1 and 2, the compressing processing unit 14-2 for areas 3 and 4, and so on.

Various methods may be used for controlling (averaging) the processing load of the compressing processing units described above. For example, it is possible for the image dividing and control unit to monitor the load of the compressing processing units, to select one or more processors whose processing load is light, and to output data (in part or in whole), which will be processed next, to the selected processing units. Alternatively, it is also possible to exchange data, which will be processed, between the compressing processing units according to the processing loads.

Next, a second embodiment of the present invention will be described.

FIG. 3 is a diagram showing an example of the configuration of a Web encoder 3 in the second embodiment of the present invention.

The Web encoder 3 in this embodiment comprises an A/D converting unit 10, a memory write controller 11, a memory 12, a requested area video read controller 33, a compressing processing unit 34-1, a compressing processing unit 34-n (the numeral 34 is used to collectively refer to the compressing processing units), a compressed data memory 35-1, a compressed data memory 35-n (the numeral 35 is used to collectively refer to the compressed data memories), and a network distributing unit 36. The Web encoder 3 is connected to a network 18.

Next, the following describes an example of processing executed by the Web encoder 3 in the embodiment shown in FIG. 3. The operation of the A/D converting unit 10, the memory write controller 11, and the memory 12 is the same as that of the Web encoder 1 shown in FIG. 1. The following describes the operation with focus on the processing different from that of the Web encoder 1 shown in FIG. 1.

The network distributing unit 36 receives request video information 381 from a client via the network 18 and outputs requested video information 361 to the requested area video read controller 33.

Based on the requested video information 361 of the client received from the network distributing unit 36, the requested area video read controller 33 generates an address 331 in the memory 12, where the requested area video data which is included in the active video/image of one frame stored in memory 12 and which corresponds to the requested video information 361 is stored, and a read signal 332, reads from the memory 12 the requested area video data 321 of the video requested by the client, and outputs requested area video data 333 and video information 334 to the compressing processing unit 34-1.

The compressing processing unit 34-1 receives the requested area video data 333 and the video information 334 from the requested area video read controller 33, compresses and encodes the received data, and outputs compressed data 341 and a write signal 342 to the compressed data memory 35-1.

Similarly, the requested area video read controller 33 receives the requested video information 361 of another client from the network distributing unit 36, generates an address 331 in the memory 12, where the requested area video data which is included in the active video/image of one frame stored in memory 12 and which corresponds to the requested video information 361 is stored, and a read signal 332, reads from the memory 12 the requested area video data 321 of the video requested by the another client, and outputs requested area video data 335 and video information 336 to the compressing processing unit 34-n.

The compressing processing unit 34-n receives the requested area video data 335 and the video information 336 from the requested area video read controller 33, compresses and encodes the received data, and outputs compressed data 343 and a write signal 344 to the compressed data memory 35-n.

Note that there are as many compressing processing units 34 and compressed data memories 35 as there are lines that are connected.

The network distributing unit 36 outputs a read signal 362 and a read signal 363 to the compressed data memory 35-1 and the compressed data memory 35-n respectively, reads compressed data 351 and compressed data 352, generates network distribution data 364 to which the network protocol is added, and distributes the distribution data to the network 18.

Figure 4B:
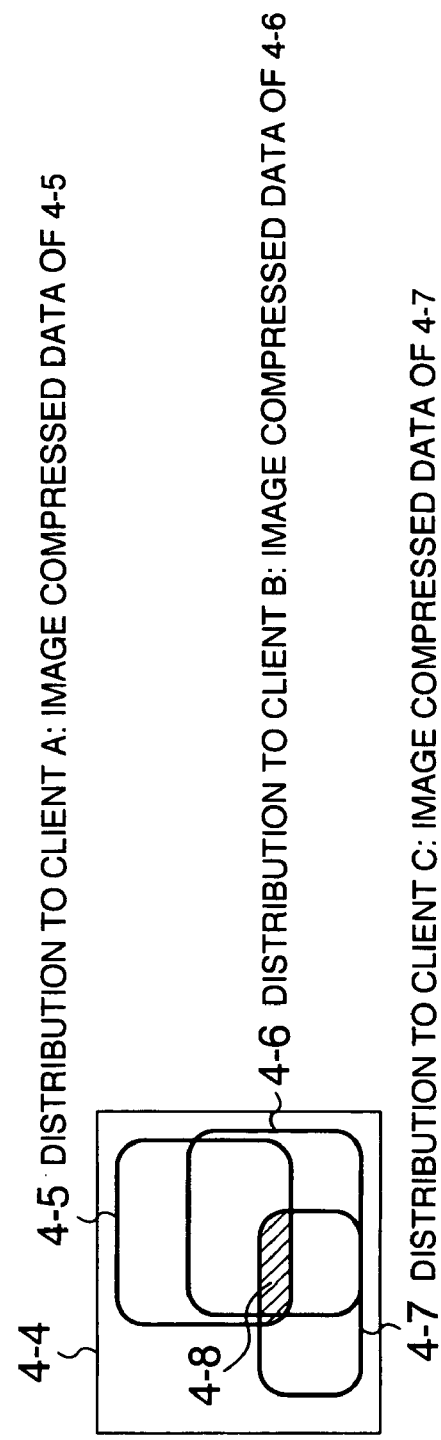

Next, the following describes the relation in this embodiment between the active video/image and client-requested videos with reference to FIGS. 4A and 4B.

As shown in FIG. 4A, the video distribution system in this embodiment comprises the Web encoder 3, client A 4-1, client B 4-2, and client C 4-3. The Web encoder and clients A, B, and C are connected via the network 18.

Assume that the area of a video in an active video/image 4-4 requested by client A is a video 4-5, the area of a video requested by client B is a video 4-6, and the area of a video requested by client C is a video 4-7.

In this case, the Web encoder 3 in this embodiment compresses the video 4-5 requested by client A, compresses the video 4-6 requested by client B, and compresses the video 4-7 requested by client C. That is, for the videos requested by the clients, there are as many compressing processing units 34 as there are clients and each compressing processing unit 34 performs the compression and encoding processing independently.

In some cases, the videos requested by clients A, B, and C overlap. For example, there is an overlapping video 4-8 shown in FIG. 4B. Because the compression processing is performed independently as described above, the overlapping video is compressed by the compressing processing units 34 of clients A, B, and C.

Next, the following describes the load of the compression and encoding processing of the Web encoder 3 in this embodiment using practical examples.

For example, assume that the image size of an input image is 1280×960, the number of connected clients is n, and the compression processing capability of the VGA (image size: 640×480) is 1. Note that the input image size is four times larger than the VGA image size.

First, because the maximum of the video size requested by a client is 1280×960, the processing capability of the compressing processing units 34 is 4. In addition, because the number of compressing processing units 34 equals the number of clients, the compression processing capability of the Web encoder 3 is n times 4 that is the compression processing capability described above. It is assumed that the clients request different video areas. For example, when the number of connected clients is 50, the compression processing capability of the Web encoder 3 is 4×50=200. Therefore, the processing capability of the Web encoder 3 in this embodiment is 4×n.

As described above, the Web encoder 3 in this embodiment uses the compressing processing unit 34 corresponding to each client and performs independent compression processing. Therefore, the size of the encoder increases. In addition, this independent compression processing is performed even when there is an overlapping video in the videos requested by the clients. For example, if 50 clients request videos and all videos include an overlapping video, the overlapping video is compressed 50 times that correspond to the number of clients. Therefore, this embodiment is advantageous when a small number of clients are connected.

On the other hand, the Web encoder 1 in the first embodiment divides one frame of active video/image into multiple areas and compresses the video of each division area. Therefore, the compressing processing unit 14, which does not depends on the number of clients, can implement the electronic PTZ function that reduces the processing load of the compressing processing unit 14.

In the Web encoder 1 in the first embodiment, the image compression and encoding unit is configured by the function of the compressing processing unit 14, the image transmission request reception unit is configured by the function of the network distributing unit 17, the transmission image area selection unit is configured by the function of the unit for reading requested area of compressed image/video data 16, and the selected area image transmission unit is configured by the function of the unit for reading requested area of compressed image/video data 16 and the network distributing unit 17.

It should be noted that the configuration of the image processing apparatus according to the present invention is not limited to those described above but various configurations may be used. For example, an apparatus with the configuration, in which the function of the Web encoder and the function of a camera are integrated, may be used.

The present invention can also be provided as a method or system for executing the processing of the present invention, a program for implementing such a method or system, and a recording medium recording therein the program. The present invention can also be provided as an apparatus or system of various types.

The present invention can be applied not only to the fields described above but also to various fields.

Various types of processing executed by the image processing apparatus according to the present invention may be configured either as a hardware resource configuration where a processor and memories are provided and the processor executes the control program stored in the ROM (Read Only Memory) for controlling the operation or as a hardware circuit where the function units for executing the processing are independent.

The present invention can also be implemented as a computer-readable recording medium, such as a floppy disk or a CD (Compact Disc)-ROM in which the control program described above is stored, or as the program (the program itself). In this case, the control program can be read from the recording medium into a computer to cause the processor to execute the program for executing the processing of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image encoding apparatus comprising:
   an image dividing unit for dividing an image into a plurality of areas which overlaps with other areas;
   a plurality of image compression and encoding units for compressing and encoding said plurality of areas of the image generated by the image dividing unit;
   a transmission request receiving unit for receiving an image transmission request from a client via a network;
   an image area selection unit for selecting areas generated by said image dividing unit to be transmitted to the client based on the image transmission request from the client; and
   an image transmission unit for transmitting a compressed and encoded image, which corresponds to the areas selected by said image area selection unit, to the client,
   wherein if said compressed and encoded image is requested by more than one client, the transmission of the requested image to the clients is prioritized so that it is transmitted to a higher-priority client before it is transmitted to a lower-priority client; and
   wherein the processing loads of said image compression and encoding units are averaged by preventing the same said image compression and encoding units from continuously compressing and encoding the same ones of said plurality of areas of the image.

2. The image encoding apparatus according to claim 1, wherein the image dividing unit equally divides the image into the plurality of areas;
   wherein the number of the plurality of image compression and encoding units is same as the number of areas divided by the image dividing unit;
   wherein, independently of the number of clients, each of the plurality of image compression and encoding units compresses and encodes the image for the each area before receiving the image transmission request.

3. An image distribution system in which a server, a plurality of clients, and an image accumulation/distribution device are connected via a network, the server comprises:
   the image processing apparatus according to claim 1 that further comprises a network interface via which the plurality of areas are transmitted to the image accumulation/distribution device;

and an image pickup device that outputs image data to the image processing apparatus, each of the plurality of clients comprises: a network interface via which the image transmission request is transmitted to the image accumulation/distribution device and, at the same time, the plurality of areas are received from the image accumulation/distribution device;

a processor that converts the plurality of areas to an image; and a display that displays the converted image, and wherein the image accumulation/distribution device comprises: a network interface via which the plurality of areas are received from the server and, at the same time, the plurality of areas are selected and transmitted based on the image transmission request.

4. An image encoding apparatus comprising:

a data encoding unit having an input terminal and a plurality of output terminals, the data encoding unit being configured to encode image data received from the input terminal into a plurality of pieces of sub-data, and to add image attribute information to each of the plurality of pieces of encoded sub-data, and to output the plurality of pieces of encoded sub-data to respective ones of the plurality of output terminals;

a plurality of data compression units connected to corresponding ones of the plurality of output terminals;

a memory configured to store the plurality of nieces of encoded sub-data;

a data obtaining unit configured to obtain desired sub-data from the plurality of nieces of encoded sub-data stored in the memories;

and an interface configured to output the obtained sub-data upon request from a client;

wherein if said obtained sub-data is requested by more than one client, the transmission of the requested obtained sub-data to the clients is prioritized so that it is transmitted to a higher-priority client before it is transmitted to a lower-priority client; and wherein the processing loads of said data compression and encoding units are averaged by preventing the same said data compression units and encoding units from continuously compressing and encoding the same ones of said plurality of nieces of sub-data.

5. An image encoding method comprising the steps of:

receiving image data in response to a client request;

extracting a plurality of pieces of sub-data from the received image data;

encoding image attribute information onto each of the plurality of pieces of the extracted sub-data;

compressing each piece of the plurality of nieces of extracted sub-data by a corresponding data compression unit;

selecting desired data from the plurality of pieces of compressed sub-data; and transmitting the selected sub-data to a client;

wherein if said selected sub-data is requested by more than one client, the transmission of the requested selected sub-data to the clients is prioritized so that it is transmitted to a higher-priority client before it is transmitted to a lower-priority client; and wherein the processing loads of the image compressing and transmitting steps are averaged by preventing the image compressing and transmitting steps from continuously compressing and transmitting the same ones of said plurality of nieces of extracted sub-data.

* * * * *